United States Patent
Briskman

(10) Patent No.: US 11,662,183 B1
(45) Date of Patent: May 30, 2023

(54) SYSTEMS AND METHODS FOR AUTOMOMOUS PROTECTION OF SATELLITES FROM HOSTILE ORBITAL ATTACKERS

(71) Applicant: Robert Briskman, Princeton, NJ (US)

(72) Inventor: Robert Briskman, Princeton, NJ (US)

(73) Assignee: GUARDIANSAT, LLC, Bethany Beach, DE (US)

( * ) Notice: Subject to any disclaimer, the term of this patent is extended or adjusted under 35 U.S.C. 154(b) by 0 days.

(21) Appl. No.: 17/943,977

(22) Filed: Sep. 13, 2022

(51) Int. Cl.
*F41H 11/02* (2006.01)
*B64G 1/52* (2006.01)
*G01S 7/38* (2006.01)

(52) U.S. Cl.
CPC .............. *F41H 11/02* (2013.01); *B64G 1/52* (2013.01); *G01S 7/38* (2013.01)

(58) Field of Classification Search
CPC .............. F41H 11/02; B64G 1/52; G01S 7/38
USPC ........................................................ 89/1.11
See application file for complete search history.

(56) References Cited

U.S. PATENT DOCUMENTS

| | | |
|---|---|---|
| 3,825,837 A | 7/1974 | Briskman |
| 4,396,528 A | 8/1983 | Abbott |
| 5,036,323 A | 7/1991 | Briskman |
| 5,120,008 A | 6/1992 | Ramohalli |
| 5,278,863 A | 6/1994 | Briskman |
| 5,319,673 A | 6/1994 | Briskman |
| 5,485,485 A | 1/1996 | Briskman |
| 5,592,471 A | 6/1997 | Briskman |
| 5,794,138 A | 8/1998 | Briskman |
| 5,864,579 A | 6/1999 | Briskman |
| 6,023,616 A | 2/2000 | Briskman |
| 6,223,019 B1 | 4/2001 | Briskman |
| 6,396,432 B2 | 5/2002 | Riemschneider |
| 6,564,053 B1 | 5/2003 | Briskman |
| 7,916,065 B1 * | 3/2011 | Mintz ..................... F41H 11/02 342/13 |
| 8,098,183 B1 * | 1/2012 | Pedersen .................. F41G 5/08 342/13 |
| 8,195,094 B1 | 6/2012 | Briskman |
| 8,258,998 B2 | 9/2012 | Factor |
| 8,833,702 B2 | 9/2014 | Briskman |
| 9,250,043 B1 * | 2/2016 | Block .................... F41G 7/306 |
| 9,573,702 B1 | 2/2017 | Jacomb-Hood |
| 10,717,549 B2 | 7/2020 | Choi |
| 10,907,940 B1 * | 2/2021 | Parker ................... G06N 20/00 |
| 2005/0275582 A1 | 12/2005 | Mohan |
| 2010/0288877 A1 | 11/2010 | Strabala |
| 2013/0292517 A1 | 11/2013 | Briskman |
| 2016/0087713 A1 * | 3/2016 | Oderman ........... H04B 7/18591 705/40 |

(Continued)

FOREIGN PATENT DOCUMENTS

| | | |
|---|---|---|
| AU | 659703 | 10/1995 |
| CA | 2103815 | 3/1995 |

(Continued)

*Primary Examiner* — Samir Abdosh
(74) *Attorney, Agent, or Firm* — Patrick Bright

(57) ABSTRACT

A system carried on a satellite in orbit around the earth is configured to detect an object on a collision or near collision course with the satellite, to determine that the object is a hostile attacker and, if so, to timely deploy one or more countermeasures to defeat, deflect, or destroy such an attacker autonomously.

6 Claims, 4 Drawing Sheets

ONE POSSIBLE EXTERNAL SATELLITE LOCATIONS FOR SUBSYSTEM ONE, TWO & THREE DEVICES

(56) References Cited

U.S. PATENT DOCUMENTS

2020/0108926 A1\* 4/2020 Smith ................ B64C 39/024
2022/0135255 A1\* 5/2022 Langill ................ B64G 1/105
                                                244/158.4

FOREIGN PATENT DOCUMENTS

| CN | ZL201380028997.5 | 8/2016 |
|----|------------------|--------|
| EP | 0610438 | 8/1994 |
| EP | WO9838749 | 9/1998 |
| EP | 0949771 | 10/1999 |
| EP | 2847747 | 4/2019 |
| JP | 2008309445 | 12/2008 |
| MX | 180437 | 10/1992 |
| RU | 2608899 | 6/2016 |

\* cited by examiner

SYSTEMS AND METHODS FOR AUTOMOMOUS PROTECTION OF SATELLITES FROM HOSTILE ORBITAL ATTACKERS

The deployment of satellites for private, government and public purposes has become widespread. As of Jan. 1, 2022, there are hundreds of thousands of satellites orbiting the earth. Satellites provide vital communications, reconnaissance, user location, TV/radio broadcast, surveillance, and observation of many earth-bound activities. But satellites are exposed to, and vulnerable to, attack in a number of ways, such as from ground-based missiles, missiles launched from aircraft, and missiles launched from assault satellites.

This invention provides systems and methods for detecting a variety of such attackers, on satellites deployed in orbits around earth, and for defeating/deflecting such attacks. These systems can be designed into new satellites or retrofitted or added to satellites, before placing such satellites into orbits. When designed into new satellites, integration with other satellite subsystems usually provides economic integration benefits.

In preferred embodiments, these systems and methods, once added to satellites, and activated, autonomously protect such satellites from attack when the satellites are deployed, in orbit, without moving the satellites from their orbits, and without altering their orbits to evade an attack or affecting normal satellite service operations.

In preferred embodiments, these systems and methods comprise three subsystems. The first subsystem detects attacking objects (hereafter called "attackers") in the area around a target satellite's orbital path, preferably in an area of many hundreds of kilometers or more around the orbiting target satellite, and provides tracking data and characteristics of the attacker to the second subsystem. Such attackers are, in most cases, moving towards the target satellite, on a collision/near collision trajectory with such target satellite.

The first subsystem uses high frequency microwave radar type devices and/or optical devices called lidars to detect and to track orbital objects that are on a collision or near collision trajectory with the satellite. Although there are many such devices, their antennas must be mounted on the satellite so that near spherical coverage is achieved. Blockage by the satellite's payload antennas, solar cells and sensors should be minimized/avoided. This can be accomplished in many ways, such as by use of multiple device antennas and/or deployment on extension booms.

In preferred embodiments, the second subsystem may be a software analyzer (the "program") which uses artificial intelligence for detecting/identifying an attacker. In this second subsystem, such a program would use attacker tracking data and characteristics from the first subsystem in the analysis. Such data may comprise: the location from which an attacker was launched; the speed of an attacker's approach; an attacker's trajectory (an attacker would likely not be in a Keplerian orbit); an attacker's surface characteristics; an attacker's rotation rate; and an attacker's size.

Such a program may also store characteristics of known attackers. Updating such characteristics tends to keep that storage current. The storage may be accessed from earth through the satellite's command subsystem for transmitting updated information/data on the characteristics of likely attackers.

The second subsystem preferably includes an optical/microwave frequency monitoring device. Many attackers radiate one or more such frequencies for their guidance tracking to the target satellite. Detection of such frequencies provides identification of attackers. Measurement of the received frequency levels from the attacker by the monitoring device also allows assessment by the program as to whether the attacker is configured to injure/destroy the target satellite through high level optical or microwave radiation.

The second subsystem determines, from the tracking data and from knowledge of the target satellite's current and future orbital position (i.e., ephemerides), the available time before an attacker collides with the satellite, and activates the third subsystem to defeat an attacker before such collision, or before the attacker is within destructive range of the target satellite.

The second subsystem calculates the time at which collision between the target satellite and the attacker will likely occur, and the required time, before collision, that defenses must be activated, including allowance for the attacker's radius of destruction.

This second subsystem also decides which countermeasure(s) to activate, and activates and deploys one or more appropriate countermeasure(s) from the third subsystem. The activation establishes the appropriate countermeasure(s), the direction of countermeasure deployment, the time of deployment from the target satellite and the time of countermeasure commencement action (e.g., a flare canister is activated by the program and launched from the target satellite at a known speed towards an area 10 km west of the target satellite and the flare is ignited by a timer pre-set by the second subsystem at arrival there).

In preferred embodiments, the second subsystem transmits its analysis, actions and, if successful, its defense against the attacker in near real time to the satellite operator via its telemetry transmitter whose transmissions are generally encrypted. Such information assists an operator in warding off future attacks.

The second subsystem can also determine whether objects that may be approaching a satellite are not attackers, but are, for example, orbital debris that is not an attacker. See U.S. Pat. No. 8,833,702 for systems/methods for addressing/avoiding such debris. The specification, claims, and drawings of this patent are incorporated by reference as though fully set forth here.

The third subsystem comprises one or more passive defenses, such as microwave/optical jammers, chaff deployers and decoy deployers, such as kinetic, heat source, light source and microwave/optical transponder. Microwave/optical frequency jamming transmitters, such as radars and lidars, may be included to blind an attacker. Many attackers radiate one or more frequencies to guide the attacker toward a target satellite.

A hostile attacker may use infra-red sensors, which emit no radiation, as a guidance means. In response, a target satellite could defend itself by launching a thermal decoy, such as a flare carrier. Such a decoy can cause an attacker to change its trajectory from the target satellite to the decoy. Other decoys may be containers of chaff, or mechanical structures, preferably with large reflective areas, such as metalized inflated balloons.

The third subsystem may also, or alternatively, have activated by the second subsystem one or more active defenses, such as heat/optical/radar seeking missiles with explosive warheads and/or kinetic missiles. This subsystem may deploy small anti-satellite missiles for explosive or kinetic collision with an attacker, or laser/microwave radiation. The third subsystem, upon activation by the second subsystem, is configured to destroy or otherwise neutralize an attacker.

The mounting of the third subsystem on the satellite must ensure that deployment of the decoys and anti-satellite missiles can be accomplished without physical obstruction by the satellite's structure or appendages.

These systems and methods for detecting a variety of attackers, with the systems in place on satellites deployed in orbits around earth, and for defeating/deflecting such attackers, preferably operate autonomously on a satellite, while the satellite is in orbit, based on satellite detection of attackers, often with information/data on attacker characteristics previously transmitted to the satellite from providers, such as security systems, located on earth.

The satellite-mounted autonomous system provides rapid response to attackers within the short time frame available between attacker detection and defeat of such an attacker. In addition, these systems and methods can rapidly discriminate between, and detect, attackers and non-attackers. As a result, non-attackers need not be, and likely are not, deflected or destroyed.

BRIEF DESCRIPTION OF THE DRAWINGS

The drawings depict a non-limiting embodiment of this invention. In these drawings.

DESCRIPTION OF THE DRAWINGS

Figure 1:
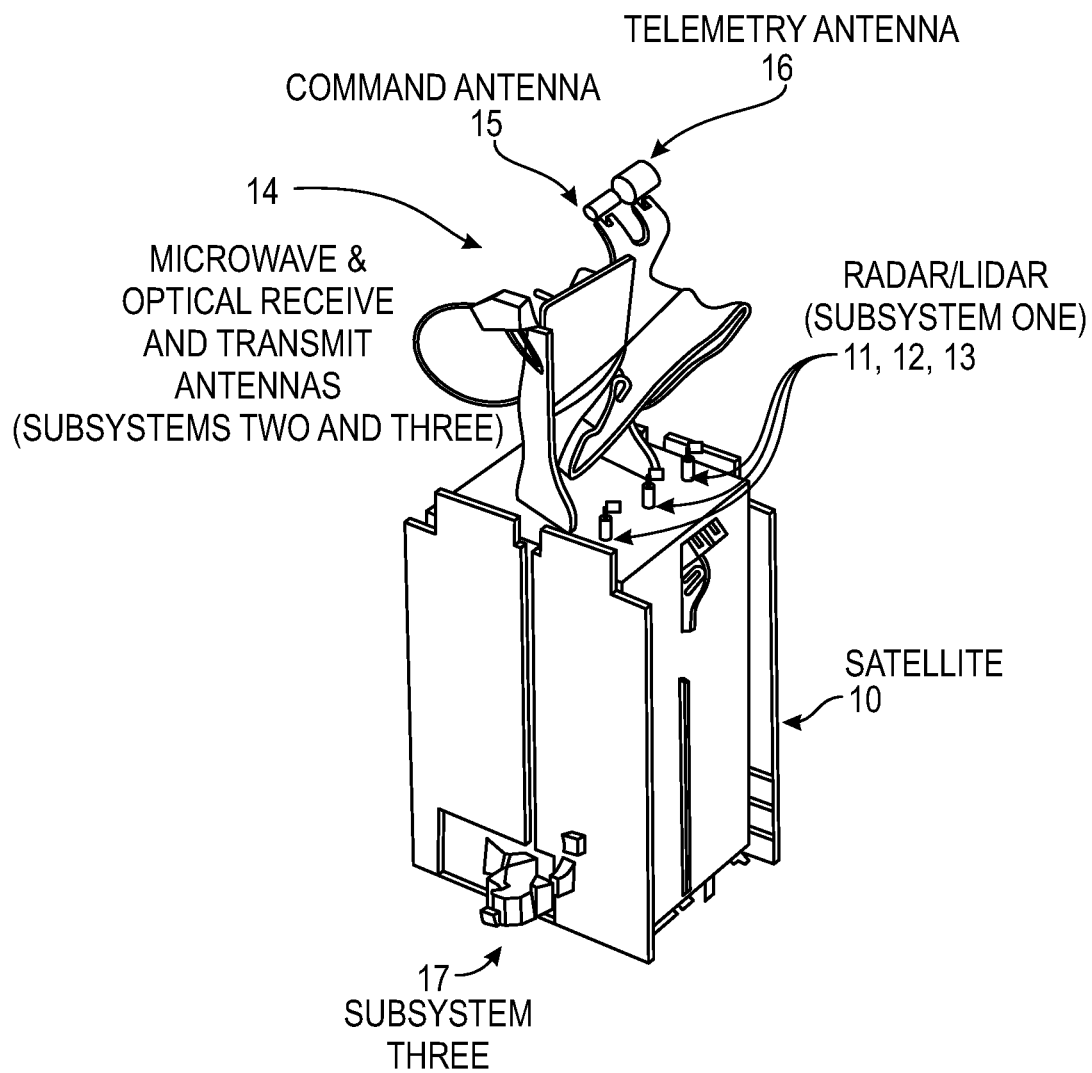
FIG. 1 shows a schematic of a satellite exemplar that includes the external elements of subsystems one, two and three.

FIG. 1 shows one type of satellite 10 that includes radar/lidars 11, 12, and 13 positioned and configured to receive information, as part of subsystem one, about possible attackers in the vicinity of satellite 10. Satellite 10 also includes optical and microwave receive/transmit antennas 14 that form part of subsystem two. Satellite 10 also includes a command antenna 15 and a telemetry antenna 16, used to communicate to the control station(s) on earth. 17 shows the location of the defensive deployers, microwave/optical antennas and missiles used in subsystem three.

Figure 2:
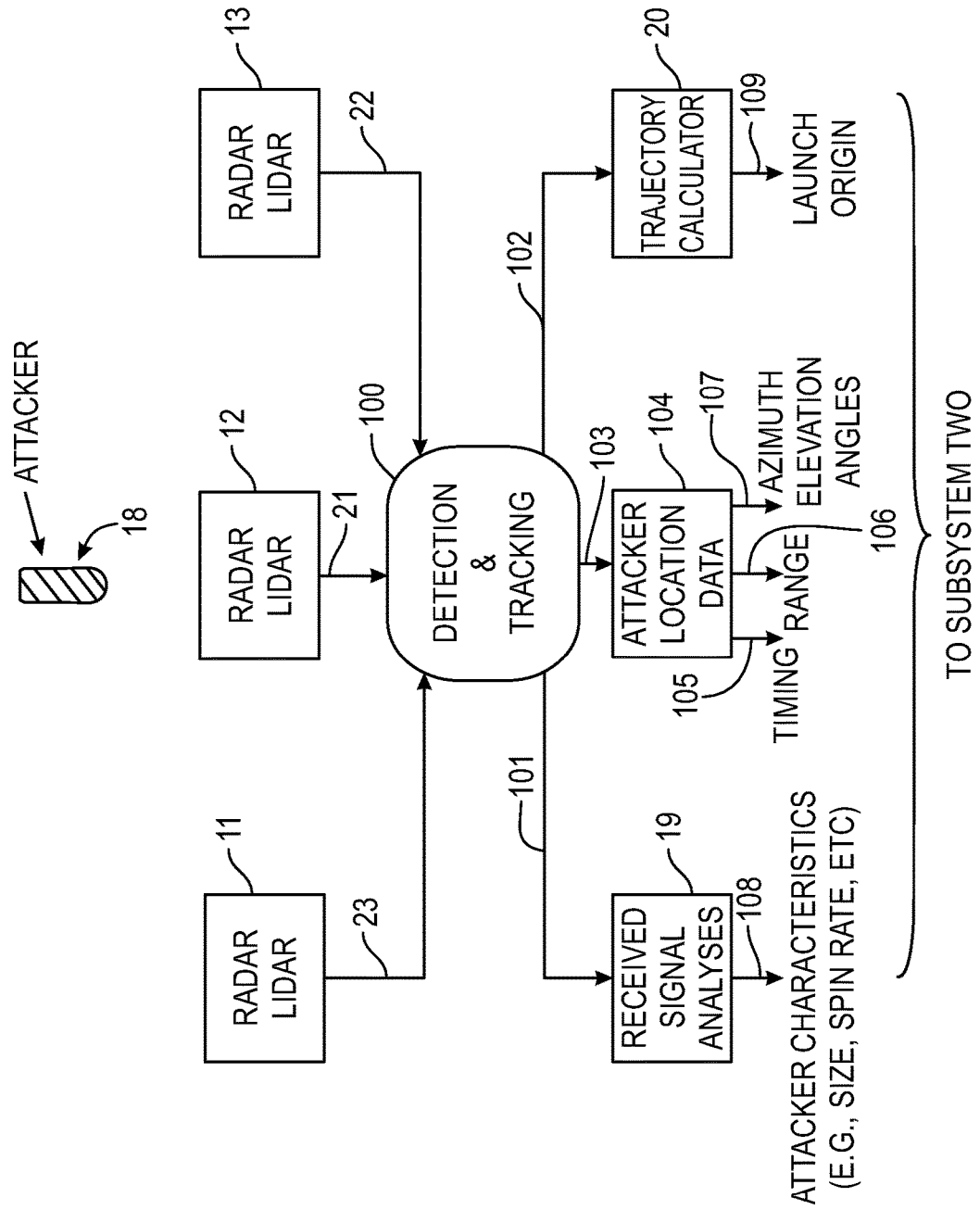
FIG. 2 shows a schematic of subsystem one on the satellite depicted in FIG. 1.

FIG. 2 shows, in schematic, exemplary form, the elements and elemental configuration of an example of subsystem one. FIG. 2 shows that information about presumptive attacker 18 is derived in part by radar/lidars 11, 12 and 13. That information passes on lines 23, 21, and 22 to detection and tracking station 100 and then to signal analyser 19 and trajectory calculator 20 on lines 101 and 102. Analyser 19 and trajectory calculator 20 pass information about attacker characteristics and attacker launch origin to subsystem two on lines 108 and 109.

On line 103, station 100 also passes attacker location data, such as timing, range, and azimuth/elevation angles, to station 104. Station 104, on lines 105, 106 and 107 passes timing, range and azimuth/elevation angles to subsystem two.

Figure 3:
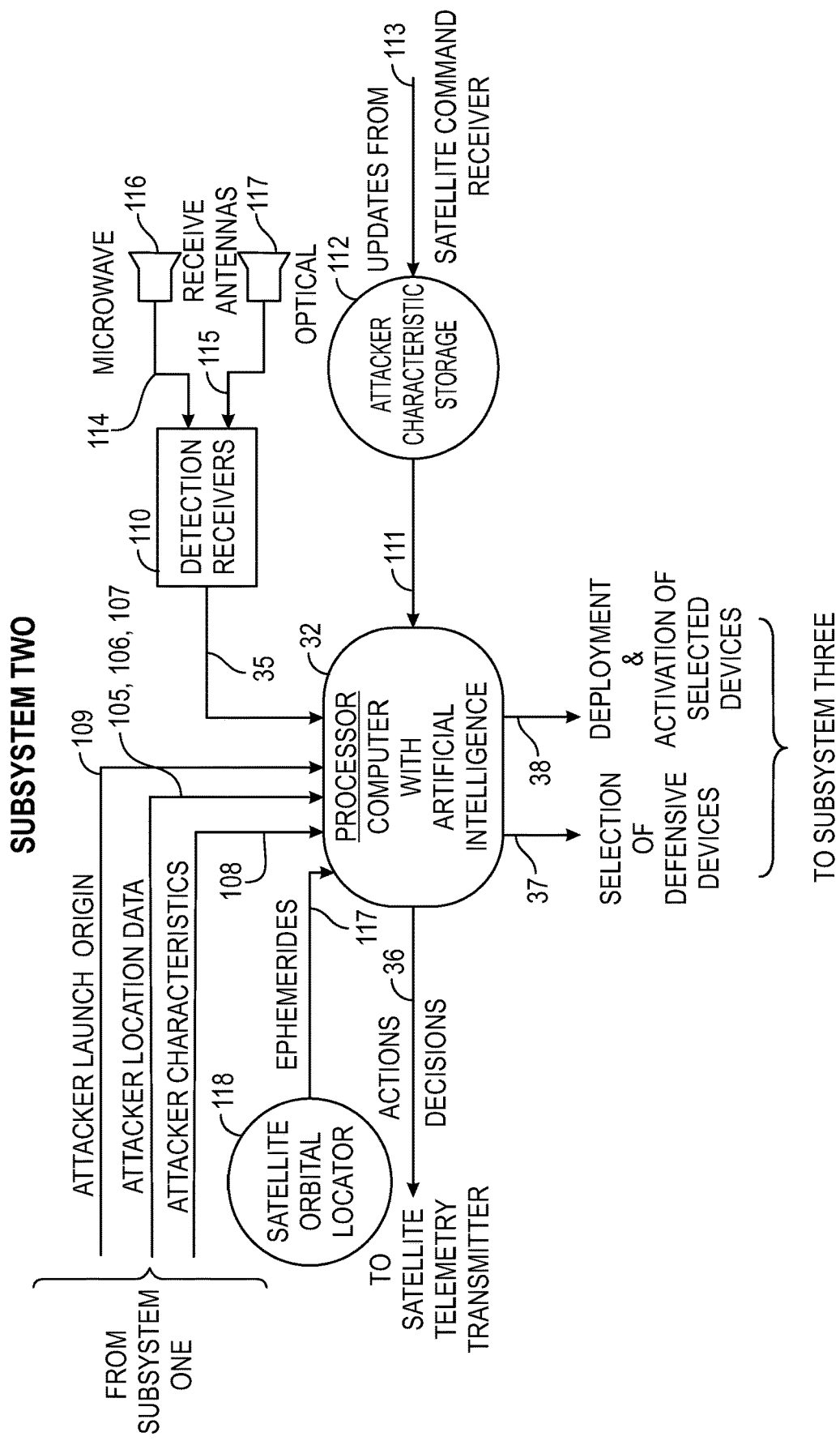
FIG. 3 shows a schematic of subsystem two on the satellite depicted in FIG. 1.

FIG. 3 shows, in schematic, exemplary form, the elements and elemental configuration of an example of subsystem two. Here, processor 32, which includes a computer programmed with artificial intelligence, receives information/data about an attacker's characteristics on line 108, and attacker tracking, location and origin information/data on paths 109 and 105/106/107.

On line 111, processor 32 receives data/information about attacker characteristics from data/information storage device 112, which can be updated through the command channel from the satellite control earth station on line 113. Device 110 also receives optical and microwave information from the attacker on lines 114 and 115 from antennas 116 and 117.

Processor 32 uses its information/data inputs to decide what responsive actions to take against an attacker, and to send those decisions to satellite telemetry transmitter, on path 36, and to subsystem three, on paths 37 and 38 to select appropriate defensive devices and to deploy and activate such devices to defeat an attacker and the timing of such deployment and activation. Satellite orbital locator 118 provides current satellite orbital location and predicts future satellite orbital locations, called ephemerides, and passes that in formation to processor 32 on line 117.

Figure 4:
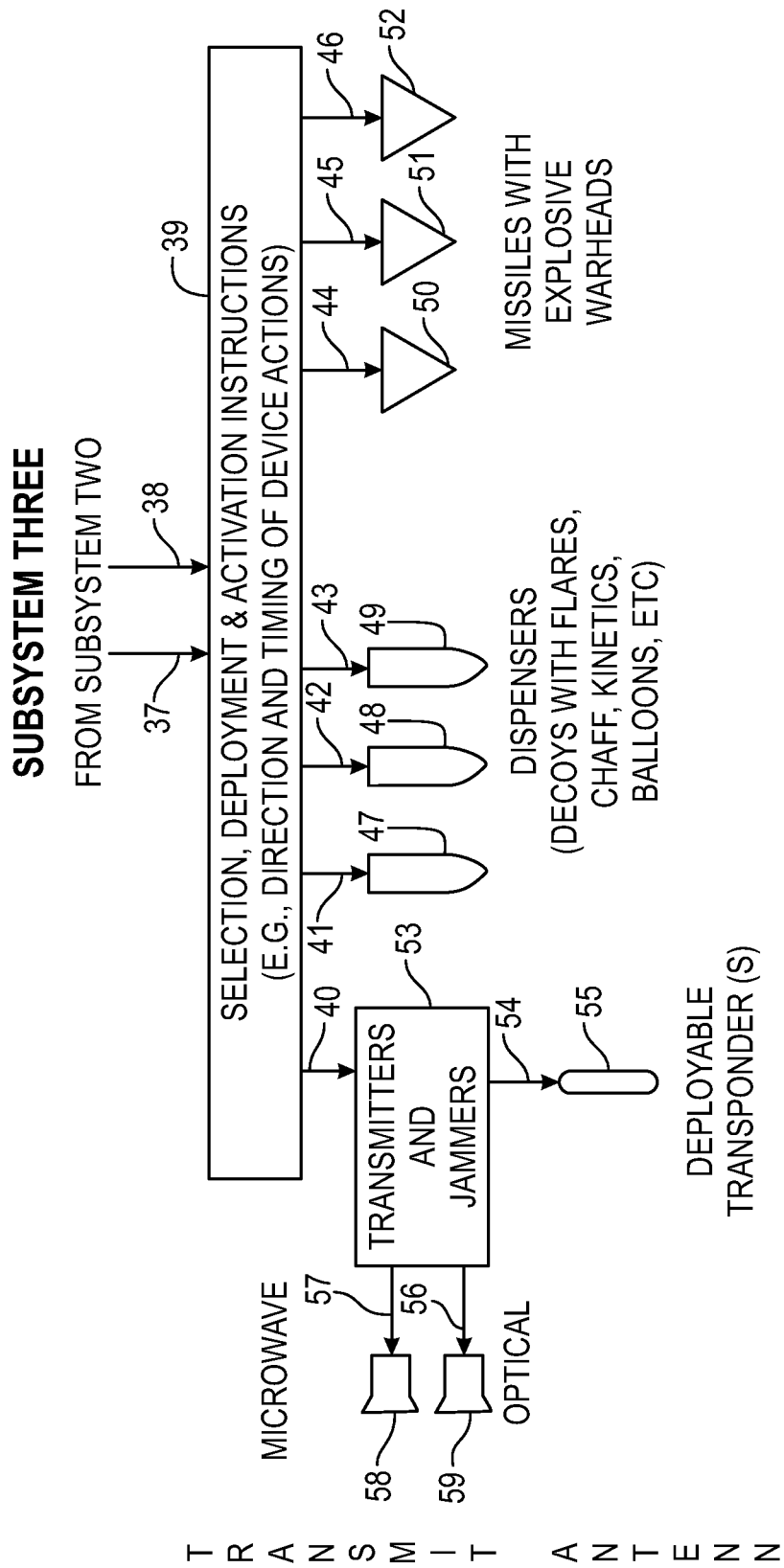
FIG. 4 shows a schematic of subsystem three on the satellite depicted in FIG. 1.

FIG. 4 shows, in schematic, exemplary form, the elements and elemental configuration of an example of subsystem three. Subsystem three receives information/data inputs from subsystem two on paths 37 and 38. At location 39, subsystem three selects, deploys and activates appropriate attacker countering systems/devices. For example, on path 40, activation and deployment information/data passes to transmitters/jammers 53, and/or, from there, to deployable transponders 55 on path 54. The optical and microwave antennas 58/59 are connected to jammer 53 on paths 56 and 57.

Alternatively, or in addition, on paths 41, 42 and 43, station 39 may pass signals to deploy and activate decoy dispensers 47/48/49. Station 39 may also, or alternatively, pass deployment/activation signals on paths 44/45/46 to missiles with explosive warheads 50/51/52. Any or all of these defenses may be activated to defeat an attacker.

Where a range of values is provided, every intervening value, between the upper and lower limit of that range and any other stated or intervening value in that stated range is included within the invention. The upper and lower limits of these smaller ranges may be included in the smaller ranges, and are likewise included within the invention. Where the stated range includes one or both of the limits, ranges excluding either or both of those included limits are also included in the invention In this specification and in the appended claims, the singular forms "a", "and", "said", and "the" include plural referents unless the context clearly dictates otherwise. The claims may be so-drafted to require singular elements or exclude any optional element. These statements provide antecedent basis for use of such exclusive terminology as "solely", "only", and the like in connection with the recitation of claim elements, and/or the use of "negative" claim limitation(s).

While this invention has been described in conjunction with the exemplary embodiments outlined above, the foregoing description of exemplary embodiments of the invention, as set forth above, is illustrative, not limiting. The invention is not necessarily so constrained. Many alternatives, adaptations modifications, and/or variations may be apparent to those skilled in the art.

I claim:

1. A system carried on a satellite in orbit around the earth comprising a first subsystem for detecting and tracking a satellite attacker, a second subsystem for determining whether said attacker is hostile, and a third subsystem for passively defeating or deflecting said attacker, or for actively destroying said attacker autonomously.

2. The system of claim 1 further comprising, in said second subsystem, a computer processor with artificial intelligence which autonomously determines said attacker's hostility using, on board said satellite, one or more of tracking data, measured attacker characteristics, information from a library of attacker characteristics, and reception of attacker's microwave and optical transmission frequencies.

3. The system of claim 2 wherein said computer is configured to determine when likely collision or near collision between said satellite and said attacker will occur, and the time within which to defeat, deflect or destroy said attacker.

4. A method for defeating an attacker moving toward collision with a satellite, while said satellite is in orbit around the earth, that includes a system on board said satellite for defeating or deflecting said attacker without altering/modifying/changing said satellite's orbital path or speed comprising: detecting said attacker, determining whether said attacker is hostile, and activating one or more countermeasure devices on said satellite to defeat, deflect or destroy said attacker.

5. A system carried on a satellite in orbit around the earth comprising a subsystem for determining whether an object approaching said satellite is hostile, for selecting an on-board countermeasure or countermeasures for defeating, deflecting or destroying any such hostile object, for calculating when to deploy and activate said countermeasure or countermeasures, and for activating said countermeasure or countermeasures at the calculated time.

6. The system of claim 5 wherein said countermeasure is selected from the group consisting of chaff deployers, decoy deployers using kinetic, heat source, light source and microwave/optical transponders, microwave/optical frequency jamming transmitters, a decoy using mechanical structures, heat/optical/radar seeking missiles with explosive warheads, anti-satellite missiles for explosive or kinetic collision with an attacker, and microwave or laser radiation.

* * * * *